July 23, 1957
C. E. BEAVER
2,800,193
COMBINATION ELECTROSTATIC PRECIPITATOR AND
HEAT CONSERVING DEVICE
Filed Nov. 9, 1955
3 Sheets-Sheet 3
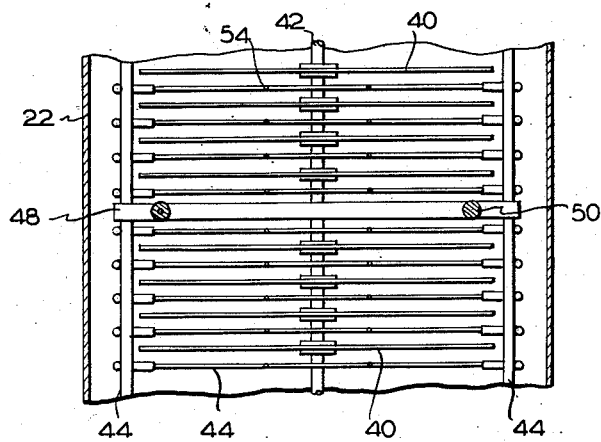
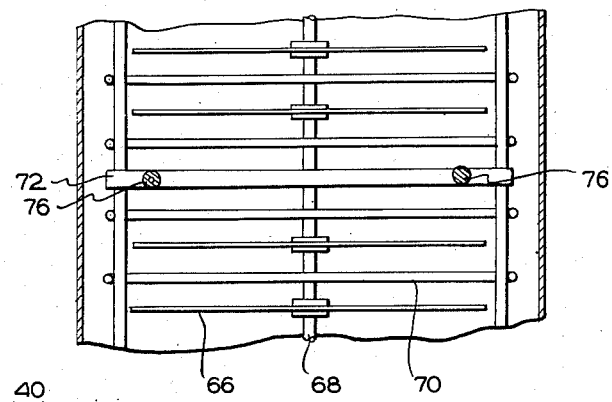
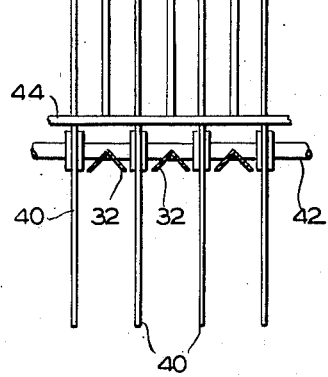
INVENTOR
CHARLES E. BEAVER
BY *Harold T. Stowell*
ATTORNEY

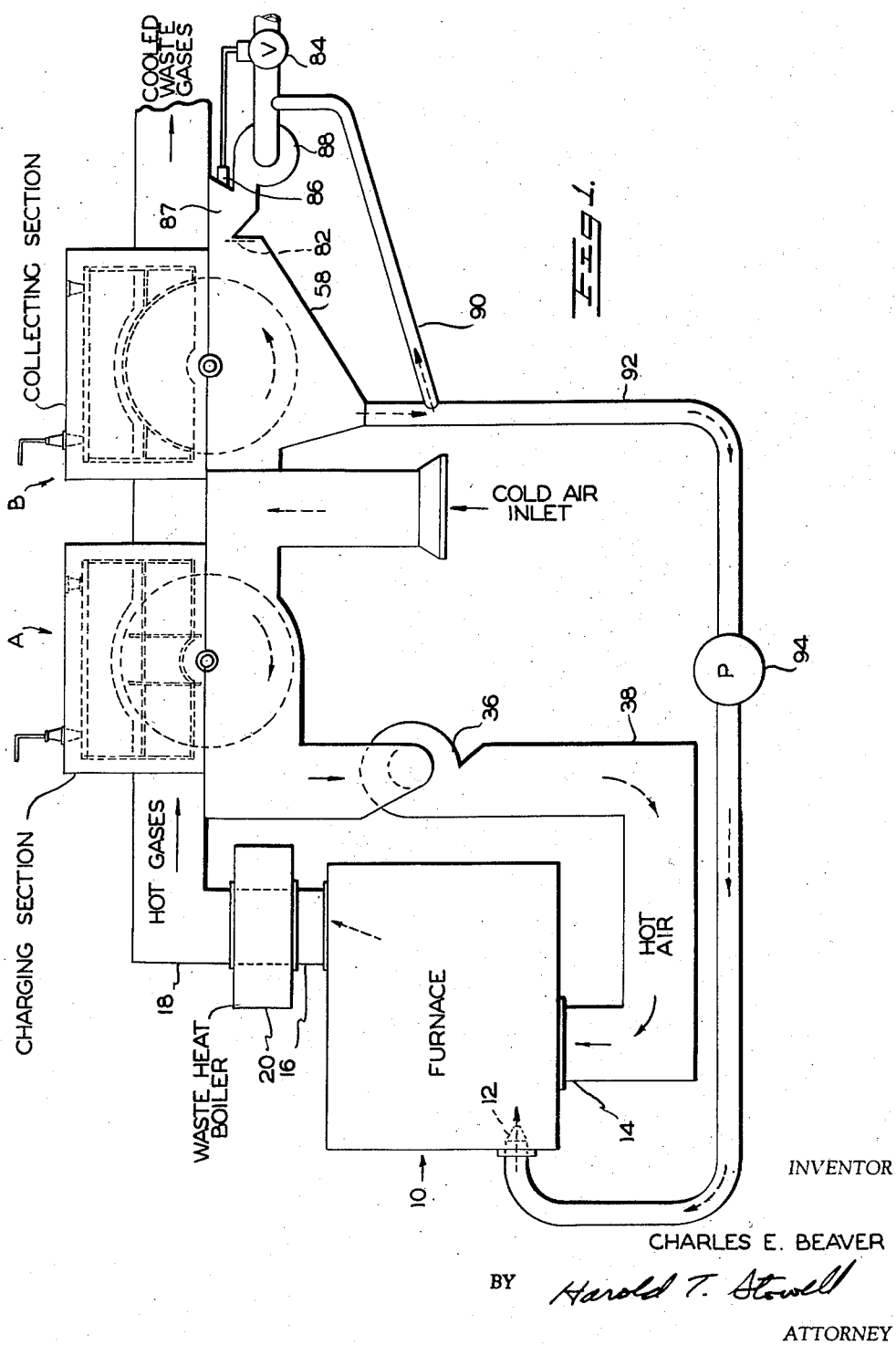

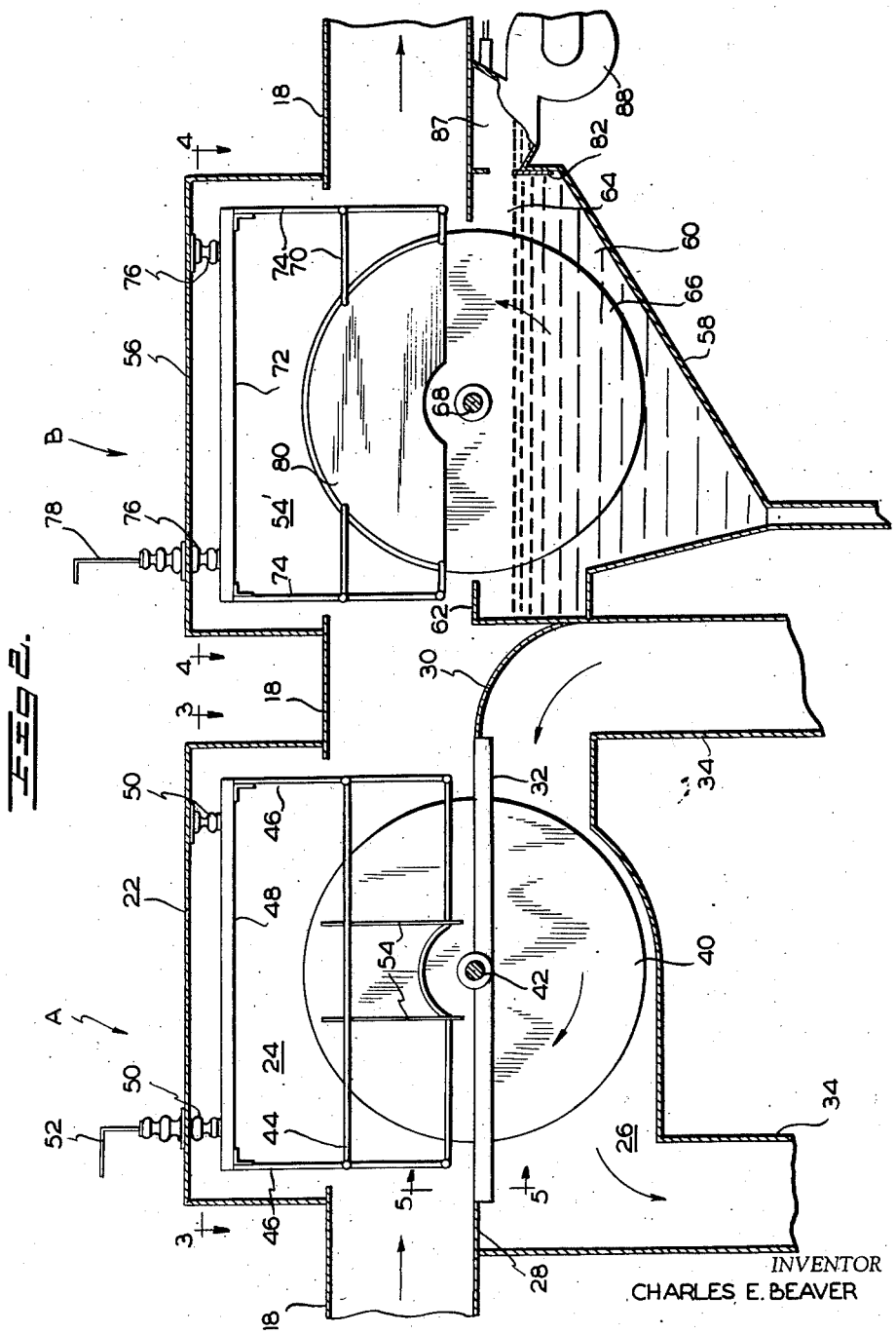

2,800,193

COMBINATION ELECTROSTATIC PRECIPITATOR AND HEAT CONSERVING DEVICE

Charles E. Beaver, Bound Brook, N. J., assignor to Research-Cottrell, Inc., Bridgewater Township, Somerset County, N. J., a corporation of New Jersey Application November 9, 1955, Serial No. 545,940

2 Claims. (Cl. 183—7)

This invention relates to a combination electrostatic precipitator and heat conserving device adapted for use in cleaning hot furnace gases and conserving the heat contained therein.

The apparatus of the present invention has particular application to the recovery of dust and heat from flue gases from furnaces burning black liquor in a sulphate process paper mill.

It is an object of the present invention to provide such a device wherein the electrodes in a first precipitator section are cleaned and cooled by a secondary air stream which is then directed to the furnace whereby the temperature of the hot gases to be treated is not limited by the boiling point of a cooling and electrode cleaning liquid.

A further object of the present invention is to provide such a device wherein the electrodes of a second precipitator section are cleaned of collected particulate material and cooled by a moving stream of liquor which is then directed to the nozzles of a furnace burning sulphate black liquor.

It is a further object of the invention to provide improved means for collecting and suspending particulate material such as salt cake in a slurry form.

It is also an object of the present invention to provide apparatus for collecting dust recovered from flue gases from furnaces burning black liquor which may be readily employed on existing furnaces burning black liquor.

The foregoing and other objects and advantages are provided by the present invention for treating hot furnace gases which generally comprises a first electrostatic precipitator section including extended surface electrodes, means mounting the extended surface electrodes in the first precipitator section for movement between two zones, complementary discharge electrodes maintained at a high potential in one of the zones, means directing a stream of hot dust laden gas between the opposed electrodes in said one zone, means directing a stream of cool gas about the extended surface electrodes in the other zone; a second electrostatic precipitator section including extended surface electrodes, means mounting the extended surface electrodes in the second precipitator section for movement between two zones, complementary discharge electrodes in one of the zones maintained at a high potential, means directing the gas stream leaving said one zone of the first precipitator section between the opposed electrodes in said one zone of the second precipitator section, and means directing a liquid about the extended surface electrodes in the other zone of the second precipitator section.

The invention will be more particularly described with reference to the illustrated embodiments of the invention shown in the accompanying drawings in which:

Fig. 1 is a diagrammatic view of a system including the novel electrostatic precipitator and heat conserving means of the present invention;

Fig. 2 is an enlarged vertical sectional view of the precipitators shown in Fig. 1;

Fig. 3 is a fragmentary section substantially on line 3—3 of Fig. 2;

Fig. 4 is a fragmentary section substantially on line 4—4 of Fig. 2; and

Fig. 5 is an enlarged fragmentary section substantially on line 5—5 of Fig. 2.

Black liquor is obtained in the sulfate pulp process from the pulp digestors after separation from the digested wood or lignocellulose material. The weak black liquor contains many valuable chemicals, including sodium sulphate, and considerable dissolved organic material. In the recovery system described, for example, in U. S. Patent 2,646,132, the black liquor is reduced to a concentration at which it will ignite and it is thereafter burned in a furnace to oxidize and volatilize the organic material and water and to reduce the sodium sulphate to sodium sulfide. The sodium sulfide is recovered from the furnace ash and, after purification, is generally reused in the digestion of further quantities of wood chips.

Generally the first concentration step for weak black liquor is performed in a conventional evaporator from which the more concentrated black liquor is conducted to an electrical precipitator wherein further concentration is effected. When the black liquor reaches the concentration at which it will ignite, it is fed into a suitable furnace and the fume issuing therefrom is conducted to the electrostatic precipitator wherein the suspended particulate material is separated and added to concentrated black liquor.

The present invention deals with apparatus for fortifying the concentrated black liquor and separating the suspended particulate materials from the gas stream issuing from the stacks of black liquor ignition furnaces.

Referring to the drawings and in particular to Fig. 1, 10 generally designates a furnace for burning concentrated black liquor and is provided with a nozzle 12 for discharging the concentrated black liquor sludge into the furnace. The furnace 10 is also provided with a hot air inlet 14 and a waste gas outlet 16, connected to a gas outlet duct 18.

A waste heat boiler 20 of conventional construction may be provided between the outlet 16 and the duct 18.

The gases after passing through the waste heat boiler 20 are conducted by conduits 18 to electrostatic precipitator sections A and B respectively. Electrostatic precipitator sections A and B may comprise a charging section where the particulate materials suspended in the gas stream conducted by conduit 18 are charged and a collecting sections wherein the particles charged in the preceding section are precipitated upon extended surface electrodes, or both sections A and B may be combined charging and precipitating sections.

Section A which will be further described as a charging section with reference to Figs. 2, 3 and 5, and generally comprises a housing 22 having an upper section 24 and a lower section or zone 26 separated by partition members 28 and 30 and substantially V-shaped baffles 32 shown more clearly in Figs. 2 and 5. Conduit 18 directs the hot furnace gases containing suspended particulate material into and out of the zone 24, while conduit 34 directs cool gases into and out of the zone 26. Conduit 34 after leaving zone 26 is connected to a conventional fan designated 36, which fan is connected by conduit 38 to the hot air inlet 14 of the furnace 10.

Within the precipitator section A are a plurality of spaced disc shaped extended surface electrodes 40 mounted for rotation upon a shaft 42. Shaft 42 is horizontally mounted in suitable bearings and connected to means for rotating the shaft and the disc like extended surface electrodes 40 in a conventional manner.

Interposed between each disc shaped electrode 40 is a high tension discharge electrode frame 44 connected by frame members 46 to bus bar 48 which bus bar is suspended from the top of the precipitator casing 22 by insulators 50. One of the insulators 50 is provided with a high tension lead in 52 connected to a conventional high voltage system for energizing the electrodes. The electrode frame 44 supports a pair of vertically extending discharge electrodes 54 which are maintained at a high potential relative to the disc like extended surface electrodes 40. As more clearly shown in Fig. 2 of the drawings the discharge electrodes 54 are positioned entirely within the precipitator zone 24.

In operation of section A of the device of the present invention the disc like extended surface electrodes 40 and the discharge electrodes 54 are energized by suitable source of high voltage electricity and the discs 40 are rotated by a suitable motor through shaft 42. Hot dust laden gases are then directed by conduit 18 through the zone 24 wherein the gas stream is divided into a plurality of parallel passages formed by the upper portions of the discs 40 between which the particles contained in the gas stream are subjected to a high potential corona discharge. Simultaneously therewith a cool air stream is directed through the lower zone 26 of section A where the heat picked up by the rotating discs 40 is dissipated into the cool air and any particles contained in the gas stream and deposited upon the discs 40 within the zone 24 are removed and suspended in the gas stream.

The baffle members 28 and 30 and the V-shaped baffles 32 interspaced between the disc like electrodes 40 satisfactorily prevent the intermixing of the cool gas stream passing through zone 28 with the hot furnace gases passing through zone 24, without preventing the entry of fallout in zone 24 from entering zone 26 where it is resuspended and carried with the air stream into the furnace through inlet 14.

The gas stream leaving zone 24 containing the charged particulate material and at a substantially lower temperature is directed to zone 54' of precipitator section B.

Precipitator section B generally comprises a housing 56 provided with a tank like bottom portion 58 adapted to contain a liquid such as concentrated black liquor 60. The black liquor 60 cooperating with the duct 18 and the baffle 62 divides the housing 56 into two sections 54' and 64.

Within the housing 56 are provided a plurality of disc like extended surface collecting electrodes 66 which are mounted in spaced relationship upon a horizontal shaft 68. The shaft 68 is mounted in suitable bearings not shown and connected to a conventional motor for rotating the shaft and the discs in the direction shown by the directional arrow. In the upper zone 54' is provided a high tension electrode frame 70 connected to a bus bar 72 by vertical members 74. The bus bar 72 is supported from the top of the housing 56 by insulators 76, one of which is connected to a suitable source of high voltage electricity through conductor 78.

Each of the frames 70 supports a substantially semicircular extended surface electrode 80 which is maintained at a high potential relative to the disc electrodes 66 whereby the charged particles, when passing between the opposed electrodes, are collected upon the discs 66. The disc electrodes 66 having deposited thereon the material suspended in the gas stream and a portion of the remaining heat therein are rotated and dipped into the liquid contained in zone 64. The electrodes passing through the liquid 60 give up their heat and the precipitated material is removed or dissolved in the liquid.

A uniform flow of liquid to the discs in tank 58 is maintained by weir 82, and automatic valve 84 which is electrically connected to a liquid level indicator generally designated 86 in fore-tank 87 for maintaining a predetermined depth of liquid in the fore-tank. A pump 88 maintains a circulation of liquid through the tank and the bypass conduit 90. When the device of the present invention is employed in the treatment and concentration of black liquor the valve 84 and pump 88 supply black liquor to the tank 58 which black liquor is fortified and concentrated as it is recirculated through the tank where it picks up precipitated ash and the like from the disc like collecting electrodes 66.

Conduit 92 which is connected to the lower end of the tank 58 and which is provided with an auxiliary pump 94 directs a portion of the liquid being circulated through the tank 58 to the fortified liquor burning nozzle 12 of furnace 10.

The cooled, clean waste gases issuing from conduit 18 of precipitator section B pass to atmosphere or to collecting means for further treatment.

From the foregoing description it will be seen that the present apparatus fully accomplishes the hereinbefore described objects and advantages of the novel gas cleaning and heat conservation system. As hereinbefore set forth the precipitator sections A and B may be both charging and collecting precipitators without departing from the scope of the present invention. Where sections A and B are combined charging and collecting precipitators the form of the electrodes 54 and 80 and the potential difference between these electrodes and the disc like electrodes 40 and 66 are arranged so that the combined action is accomplished in each of the sections as is well known in the electrical precipitation art.

I claim:

1. Apparatus for treating hot gases issuing from recovery furnaces burning black liquor comprising a first electrostatic precipitator section including extended surface electrodes, means mounting said extended surface electrodes in the first precipitator section for movement between two zones, complementary discharge electrodes maintained at a high potential in one of said zones, means directing a stream of hot gas issuing from the recovery furnace between the opposed electrodes in said one zone, means directing a stream of cool air about the extended surface electrodes in the other zone and then to an air inlet in the recovery furnace, a second electrostatic precipitator section including extended surface electrodes, means mounting said extended surface electrodes in said second precipitator section for movement between two zones, complementary discharge electrodes in one of the zones maintained at a high potential, means directing the gas steam leaving said one zone of the first precipitator section between the opposed electrodes in said one zone of the second precipitator section, and means directing a stream of black liquor about the extended surface electrodes in the other zone of the second precipitator section and then to the recovery furnace.

2. Apparatus as defined in claim 1 wherein said first precipitator section comprises a particle charging section, and said second precipitator section comprises a collecting section.

References Cited in the file of this patent
UNITED STATES PATENTS

| | | |
|---|---|---|
| 2,383,112 | Dahlman | Aug. 21, 1945 |
| 2,582,133 | Karlsson | Jan. 8, 1952 |
| 2,663,380 | Savitz | Dec. 22, 1953 |
| 2,701,622 | Hodson | Feb. 8, 1955 |